Figure 1:
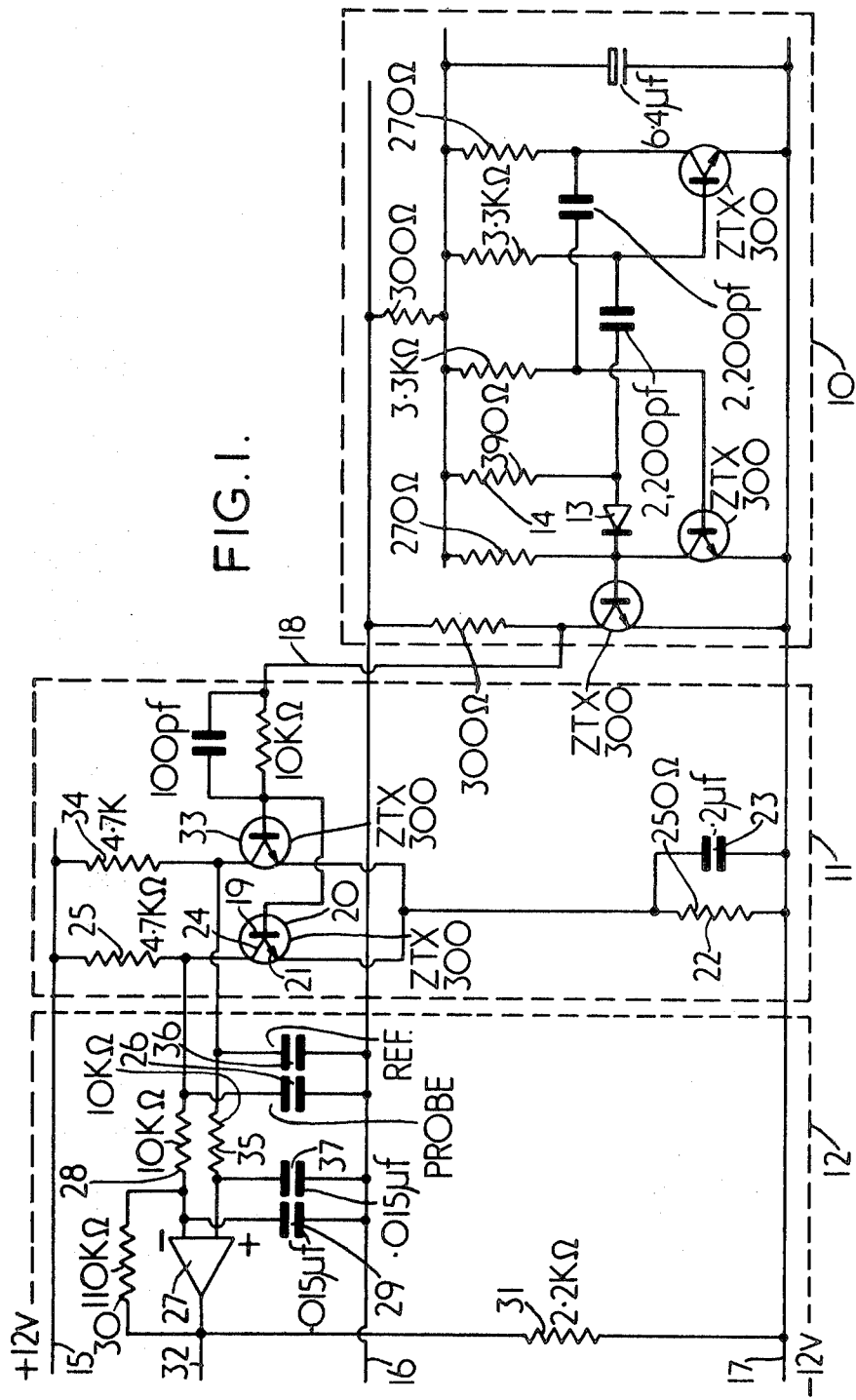

United States Patent

[11] 3,611,124

[72] Inventor Bernard Bollons
 Warwick, England
[21] Appl. No. 842,301
[22] Filed July 16, 1969
[45] Patented Oct. 5, 1971
[73] Assignee Cape Engineering Company Limited
 Warwick, England
[32] Priority Aug. 28, 1968
[33] Great Britain
[31] 41012/68

[54] MEASURING CIRCUIT INCLUDING SWITCHING MEANS FOR CHARGING A CAPACITANCE WITH ALTERNATE POLARITIES IN EACH SWITCHING CYCLE
 6 Claims, 2 Drawing Figs.
[52] U.S. Cl. .................................................. 324/60 C,
 324/62 C
[51] Int. Cl. .................................................. G01r 27/26,
 G01r 27/02
[50] Field of Search .......................................... 324/60, 62;
 331/113, 65

[56] References Cited
 UNITED STATES PATENTS
3,031,617  4/1962  Paquette .................... 324/61
 OTHER REFERENCES
Bailey D. F. Direct Reading Capacitance Meter in Wireless World. April 1964, pp. 204– 207. TK 5700 W45.

Primary Examiner—Alfred E. Smith
Attorney—Mawhinney & Mawhinney

ABSTRACT: An electrical circuit includes a condenser, resistor switching means and constant voltage source. One plate of the condenser is at constant voltage, the switching means connects the other plate alternately to a different constant voltage and to a constant voltage different from the latter. In one of the switch connecting conditions the resistor is switched in series with the condenser. The means voltage across the resistor while current passes through it can be used to measure the condenser capacity, resistor resistance, switching frequency or value of one constant voltage.

MEASURING CIRCUIT INCLUDING SWITCHING MEANS FOR CHARGING A CAPACITANCE WITH ALTERNATE POLARITIES IN EACH SWITCHING CYCLE

The invention relates to an electrical circuit arranged to be connected to an electrical component, not included in the electrical circuit, for measuring a parameter of the electrical component. The circuit is readily adapted for measuring the capacity of a condenser, the resistance of a resistor or the frequency of current passing through the electrical component. Circuits for making such measurements are well known but suffer defects such as nonlinearity, limited range or limited upper frequency.

An object of the invention is to reduce such defects.

According to the invention there is provided apparatus for measuring a parameter of an electrical circuit or component comprising two substantially identical circuit portions, each circuit portion including a condenser, a resistor and switching means, wherein the improvement comprises operating each of said switching means in an identical switching cycle during which it connects a charging voltage to the associated condenser until the condenser is substantially fully charged in one polarity sense and then connects the condenser to charge in the opposite polarity sense through its associated resistor until the condenser is substantially fully charged, the charging in opposite polarity senses being completed to such an extent that the mean voltages across the respective condensers over a switching cycle are directly proportional to a parameter of the respective circuit portion; there being further provided a differential operational amplifier responsive to said mean voltages across the respective condensers in the two circuit portions for producing an output proportional to the difference in said mean voltages over said switching cycle, and voltage-measuring means responsive to the output of said differential operational amplifier, whereby, with one of said condensers connected to form at least a part of said electrical circuit or component, the voltage measured by said voltage-measuring means is a function of the parameter of the electrical circuit or component to be measured.

In one embodiment of the invention the apparatus is arranged to measure the resistance of one of said resistors and the capacity of the associated condenser has a predetermined value, whereby said difference in mean voltages will be a function of the value of said resistance.

In another embodiment of the invention the apparatus is arranged to measure the capacitance of one of said capacitors and the resistance of the associated resistor has a predetermined value, whereby said difference in mean voltage will be a function of the value of said capacity.

Preferably, electrical smoothing circuits connected between the condensers and said operational amplifier.

Conveniently, the condenser other than that connected to form at least part of the electrical circuit or component whose parameter is to be measured is adjustable in value, whereby to provide a calibrated reference voltage or a zero setting means.

In a further embodiment of the invention the switching means each operate repetitively in a series of identical switching cycles whereby the voltage measured by said voltage-measuring means will attain a steady value which will be directly proportional to the frequency of repetition of the switching cycles.

Figure 2:
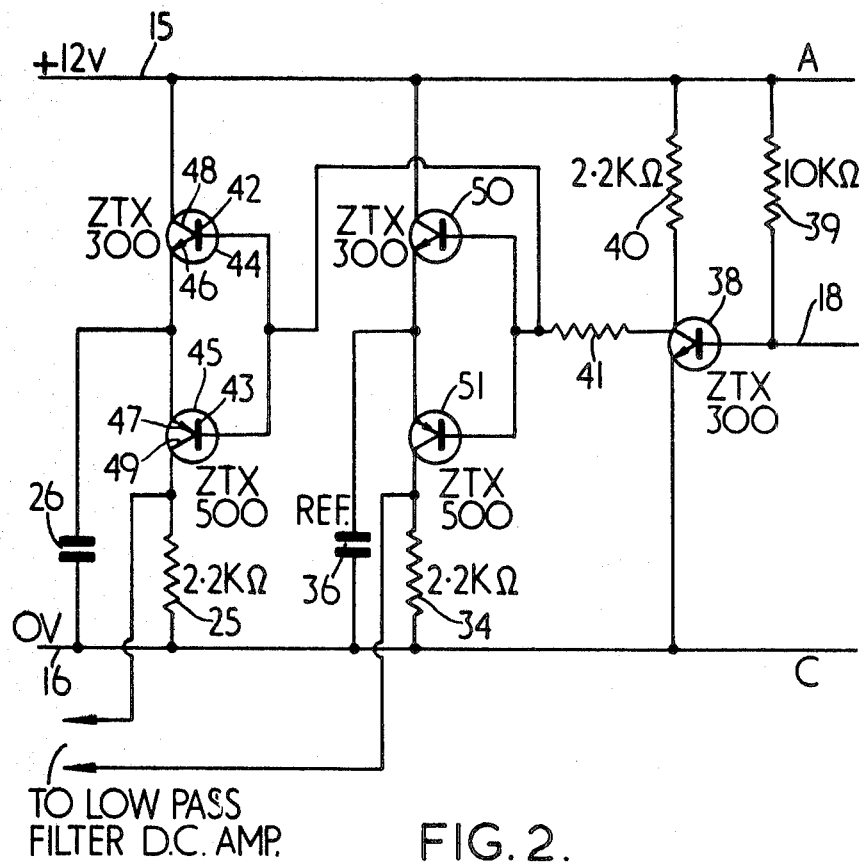

In the drawings:

FIG. 1 is a circuit diagram of an electrical circuit according to the invention, and FIG. 2 is an alternative embodiment to part of FIG. 1.

In FIG. 1 a circuit diagram which can readily be put into effect by one skilled in the art, is divided into three main sections, an oscillator 10, a switching and resistor section 11, and a condenser and output section 12. As the function of many components will be well known, they will not be mentioned.

The oscillator 10 is a conventional multivibrator in which the diode 13 and resistor 14 provide reliable initiation of oscillation. The output is of square wave form of frequency typically 100 kc. to 1 mc. The electrical circuit is supplied with stabilized DC voltages of +12, 0 and −12 applied respectively to supply lines 15, 16 and 17. The accuracy of stabilization of the DC supply voltages must be comparable with the required accuracy of the final measurement.

The output 18 of the oscillator 10 is fed to the base 19 of an NPN silicon planar transistor 20 of which the emitter 21 is connected to the line 17 through a thermal stabilizing resistor 22 shunted by a condenser 23 so that at the switching frequency the emitter 21 is virtually at −12 volts. The collector 24 of the transistor 20 is connected to the bottom end of a high precision high stability resistor 25, of which the top end is connected to the line 15.

The collector 24 is also connected to one plate of a condenser 26 which constitutes a capacitive transducer probe of the displacement measuring system. The other plate of the condenser 26 is connected to the line 16.

The output of the system can be measured across the resistor 25, that is from the collector 24 to the +12-volt line 15. It is more convenient, however, to measure it from the collector 24 to the zero voltage line 16, for which purpose the collector 24 is connected to one input of a DC or operational amplifier 27 through a low-pass filter of well known type formed of a resistor 28 and condenser 29. The operational amplifier 27 has a feedback resistor 30, and a load resistor 31 between its output line 32 and the line 17. The direct-current output of the system is conveniently measured between the output line 32 and the 0-volt line 16.

To compensate for the effect of temperature on the most critical components a duplicate portion of the circuit, having substantially identical components, is provided by a transistor 33, resistors 34 and 35 and condensers 36 and 37, corresponding respectively to the transistor 20, resistors 25 and 28 and condensers 26 and 29. The output of the duplicate portion of circuit is also fed to the input of the operational amplifier 27 in well-known manner such that the inputs from the two similar circuits are subtracted. In this way temperature change will produce an identical effect on each component of a like pair so that the input voltages to the operational amplifier 27 will change by an identical amount which will have no effect on the output of the operational amplifier 27.

The condenser 26, for measuring the relative displacement between two bodies, conveniently has one plate fastened to one of the bodies and the other plate fastened to the other of the bodies and is arranged so that the displacement causes change of overlap of the parallel plates whereby the capacity change will be proportional to the displacement. The condenser 36 may not be physically identical to the probe condenser 26 but is conveniently adjustable in capacity so that it can be used as a zero adjuster or a calibrated reference.

In operation, the oscillator output voltage is alternately at −12 volts or 0 volts. When it changes to 0 volts, the base 19 of the transistor 20 also changes to 0 volts, whereupon the transistor 20 conducts and connects the upper plate of the condenser 26 together with the bottom of the resistor 25 to the −12 volt line 17. The bottom plate of the condenser 26 remains at 0 volts. When the oscillator output voltage changes to −12 volts, the transistor 20 ceases to conduct, whereupon current flows through the resistor 25 to change the charge on the condenser 26 until the upper plate reaches +12 volts. The rise in voltage of the upper plate, from −12 volts to +12 volts, therefore varies exponentially with time. The mean voltage across the condenser 26 or across the resistor 25 during one cycle of the oscillator is proportional to the values of the voltages across the lines 15, 16, 17, the capacity of the condenser 26 and the resistance of the resistor 25. By keeping all but one of these values constant, the variable value can be measured. The circuit can therefore be used as a capacity meter or a resistance meter. Provided a suitable recording means is provided, for determining the mean voltage, the system can be used with a single cycle of operations. However, it is more convenient to operate the system repetitively as with the oscillator 10 shown, provided that the exponential voltage change is virtually complete within one cycle. In such repetitive operation, the mean voltage becomes also proportional to the oscillator frequency. This must obviously be controlled very accurately. Alternatively, by keeping all the other values constant, the system can be used to measure the frequency of switching.

FIG. 2 shows an alternative to part of the circuit of FIG. 1 which achieves the same result. The oscillator feeds through line 18 and a transistor 38, having associated resistors 39, 40 and 41, to the bases 42, 43 of an NPN transistor 44 and a PNP transistor 45. The emitters 46, 47 of both transistors 44, 45 are connected to the upper plate of the probe condenser 26 in FIG. 2, of which the lower plate is connected to the 0-volt line 16. The collector 48 of the transistor 44 is connected to the 12-volt line 15. The collector 49 of the transistor 45 is connected to the top end of the high precision resistor 25 in FIG. 2 and to the input of the low-pass filter comprising the resistor 28 and condenser 29 of FIG. 1. The bottom end of the resistor 25 is connected to the 0-volt line 16.

For temperature compensation, as in FIG. 1, a duplicate portion of the circuit is provided comprising transistors 50, 51, condenser 36 and resistor 34. The output from the collector of the transistor 51 is fed to the duplicate low-pass filter comprising the resistor 35 and condenser 37 of FIG. 1. The same use is made of the operational amplifier 27.

In operation, when the output voltage from the oscillator 10 is at one level, one of the transistors 42, 43 will conduct while the other is open circuit. When the oscillator voltage is at its other level the other of the transistors 42, 43 will conduct and the one will be open circuit. While the transistor 42 conducts, the upper plate of the condenser 26 will be at +12 volts, the lower plate is at 0 volts and there is no current through the resistor 25. When the transistor 42 becomes open circuit and the transistor 43 becomes conductive, the charge on the condenser 26 leaks away through the resistor 25 so that there is a voltage across the resistor 25 which decays in an exponential form. As in the embodiment shown in FIG. 1, the average of the exponential voltage is proportional to the capacity of the condenser 26, the resistance of the resistor 25, the values of the DC voltages, and the switching frequency of the transistors 42, 43.

To minimize extraneous temperature effects, the circuit, or at least the critical portions thereof may be kept in a constant-temperature oven.

What I claim as my invention and desire to secure by Letters Patent of the United States is:

1. Apparatus for measuring a parameter of an electrical circuit or component comprising two substantially identical circuit portions, each circuit portion including a condenser, a resistor and switching means, wherein the improvement comprises operating each of said switching means in an identical switching cycle during which it connects a charging voltage to the associated condenser until the condenser is substantially fully charged in one polarity sense and then connects the condenser to charge in the opposite polarity sense through its associated resistor until the condenser is substantially fully charged, the charging in opposite polarity senses being completed to such an extent that the mean voltages across the respective condensers over a switching cycle are directly proportional to a parameter of the respective circuit portion; there being further provided a differential operational amplifier responsive to said mean voltages across the respective condensers in the two circuit portions for producing an output proportional to the difference in said mean voltages over said switching cycle, and voltage measuring means responsive to the output of said differential operational amplifier, whereby, with one of said condensers connected to form at least a part of said electrical circuit or component, the voltage measured by said voltage measuring means is a function of the parameter of the electrical circuit or component to be measured.

2. Apparatus as claimed in claim 1 arranged to measure the resistance of one of said resistors, in which the capacity of the associated condenser has a predetermined value, whereby said difference in mean voltages will be a function of the value of said resistance.

3. Apparatus as claimed in claim 1 arranged to measure the capacity of one of said condensers, in which the resistance of the associated resistor has a predetermined value, whereby said difference in mean voltage will be a function of the value of said capacity.

4. Apparatus as claimed in claim 1 including electrical smoothing circuits connected between the condensers and said operational amplifier.

5. Apparatus as claimed in claim 1 in which the condenser other than that connected to form at least part of the electrical circuit or component whose parameter is to be measured is adjustable in value, whereby to provide a calibrated reference voltage or a zero setting means.

6. Apparatus as claimed in claim 1 in which the switching means each operate repetitively in a series of identical switching cycles whereby the voltage measured by said voltage-measuring means will attain a steady value which will be directly proportional to the frequency of repetition of the switching cycles.